(12) United States Patent
Kamiji et al.

(10) Patent No.: US 11,585,683 B2
(45) Date of Patent: Feb. 21, 2023

(54) MAGNETIC ENCODER MANUFACTURING METHOD

(71) Applicant: NAKANISHI METAL WORKS CO., LTD., Osaka (JP)

(72) Inventors: Michiyuki Kamiji, Osaka (JP); Yoshihiro Ito, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 659 days.

(21) Appl. No.: 16/562,251

(22) Filed: Sep. 5, 2019

(65) Prior Publication Data

US 2020/0080868 A1 Mar. 12, 2020

(30) Foreign Application Priority Data

Sep. 7, 2018 (JP) .............................. JP2018-167762

(51) Int. Cl.
*G01D 5/245* (2006.01)
*B29C 45/00* (2006.01)
*G01D 11/24* (2006.01)

(52) U.S. Cl.
CPC ....... *G01D 5/2451* (2013.01); *B29C 45/0013* (2013.01); *G01D 11/245* (2013.01); *B29K 2995/0008* (2013.01)

(58) Field of Classification Search
CPC ............. G01D 11/245; G01D 2205/80; G01D 5/2451; B29C 48/15; B29C 45/14819; B29C 45/14008; B29C 45/14; B29C 2045/14942; B29C 45/0062; B29C 45/0053; B29C 45/0013
See application file for complete search history.

(56) References Cited

U.S. PATENT DOCUMENTS 9,476,735 B2 10/2016 Ito
2016/0346975 A1* 12/2016 Kamiji ................ B29C 45/2708
2018/0299294 A1* 10/2018 Mock .................. B29C 45/1671

FOREIGN PATENT DOCUMENTS

| JP | 2006-133018 A | 5/2006 |
|----|---------------|--------|
| JP | 4189696 B2 | 12/2008 |
| JP | 4682529 B2 | 5/2011 |
| JP | 4685683 B2 | 5/2011 |
| JP | 2015-081883 A | 4/2015 |
| JP | 2015-108573 A | 6/2015 |

* cited by examiner

*Primary Examiner* — Stella K Yi
(74) *Attorney, Agent, or Firm* — Kratz, Quintos & Hanson, LLP (57) ABSTRACT

A magnetic encoder in which a support member and a plastic magnet do not adhere to each other is manufactured using a mold. The plastic magnet has a turning molded portion on the outer circumferential side thereof. The gate of the mold is an inner-diameter-side disk gate and a length L thereof in the axial direction is in a range of 0.2 mm≤L≤0.6 mm. The tensile strength of the material of the plastic magnet is 65 MPa or more and the Young's modulus thereof is 4000 MPa or more and 15000 MPa or less. The method includes a step of opening the mold and placing the support member as an insert object in the mold, and a step of closing the mold and injecting a melted material of the plastic magnet into a cavity through the disk gate.

2 Claims, 12 Drawing Sheets

Fig. 8B

MAGNETIC ENCODER MANUFACTURING METHOD

BACKGROUND OF THE INVENTION

Field of the Invention

The present invention relates to a method for manufacturing a magnetic encoder used for detecting the rotation speed (number of revolutions) of a rotary body, and in particular, relates to a method for manufacturing a magnetic encoder having no adhesive layer between an annular support member and an annular plastic magnet, using an injection molding mold.

DESCRIPTION OF THE BACKGROUND ART

A magnetic encoder device used for detecting the rotation speed (number of revolutions) of a rotary body includes a magnetic encoder attached to the rotary body, and a sensor attached to a non-rotary body.

The magnetic encoder includes an annular support member for attachment to the rotary body, and an annular magnet member fixed to the annular support member and magnetized in a multipole form so as to have N poles and S poles at regular intervals in the circumferential direction.

The sensor is opposed to the annular magnet member, to detect rotation of annular magnet member.

In some manufacturing methods, using a plastic magnet as the annular magnet member, injection molding is performed with the annular support member being placed as an insert object, in a state in which a thermosetting adhesive is applied to a surface of the annular support member, which is joined to the plastic magnet, thereby manufacturing a magnetic encoder (see, for example, Patent Literatures 1 and 2). In such a manufacturing method, the annular support member and the annular plastic magnet are fixed by adhesion.

In other manufacturing methods, using a plastic magnet as the annular magnet member, injection molding is performed with the annular support member being placed as an insert object, without applying a thermosetting adhesive to a surface of the annular support member, which is joined to the plastic magnet, thereby manufacturing a magnetic encoder (see, for example, Patent Literatures 3 and 4). In such a manufacturing method, the annular support member and the annular plastic magnet are not fixed by adhesion, but the annular support member and the annular plastic magnet are mechanically fixed to each other.

In the magnetic encoder shown in Patent Literature 3, cutouts 23 and through holes 24 are formed in a flange portion 21 of a slinger 20 which is an annular support member, and used for mechanically fixing the slinger 20 which is the annular support member and an encoder 30 which is an annular plastic magnet.

In the magnetic encoder shown in Patent Literature 4, multiple radial grooves 21 extending in the radial direction and opened toward the inner diameter side are formed so as to be arranged in the circumferential direction on the surface of the core metal 20 which is an annular support member, and a turning molded portion 41 is formed on the inner circumferential side of a scale molded body 40 which is an annular plastic magnet. The multiple radial grooves 21 and the turning molded portion 41 are used for mechanically fixing the core metal 20 which is the annular support member and the scale molded body 40 which is the annular plastic magnet.

CITATION LIST

Patent Literature

[PTL 1] Japanese Patent No. 4189696
[PTL 2] Japanese Unexamined Patent Application Publication No. 2015-108573
[PTL 3] Japanese Patent No. 4682529
[PTL 4] Japanese Patent No. 4685683

SUMMARY OF THE INVENTION

As described above, the magnetic encoder manufacturing methods in Patent Literatures 1 and 2 require a process of applying a thermosetting adhesive to the annular support member. This causes the management in degreasing and adhesion processes to be troublesome, and comparatively large-scale equipment for the degreasing and adhesion processes is needed. These cause the manufacturing cost to increase.

On the other hand, in the magnetic encoder manufacturing methods in Patent Literatures 3 and 4, as described above, it is necessary to perform working for forming the cutouts and the through holes, or the radial grooves arranged in the circumferential direction, on the annular support member, in order to mechanically fix the annular support member and the annular plastic magnet. Thus, the manufacturing cost for the annular support member increases.

Meanwhile, if the magnetic encoder is used in an environment in which the temperature greatly varies, e.g., in the case where the magnetic encoder is used for a rolling bearing (hub bearing) for supporting a wheel of an automobile, it is required that damage such as crack does not occur in the annular plastic magnet even after conduction of 1000 or more cycles of thermal shock test (heat cycle test) in which, in each cycle, the magnetic encoder is situated under an environment at 120° C. for 30 minutes and then is situated under an environment at −40° C. for 30 minutes, for example (see, for example, Table 2 in Patent Literature 1).

In view of the above circumstances, an object to be achieved by the present invention is to provide a method for manufacturing a magnetic encoder having no adhesive layer between an annular support member and an annular plastic magnet. In the magnetic encoder manufactured by the method according to the present invention, a joining force between the annular support member and the annular plastic magnet can be kept, without performing working on the annular support member for mechanically fixing the annular support member and the annular plastic magnet to each other, and the annular plastic magnet is prevented from being damaged even under the usage environment in which the temperature greatly varies.

The summary of the present invention is as follows.

[1] A magnetic encoder manufacturing method for manufacturing, using an injection molding mold, a magnetic encoder which includes an annular support member formed from a steel plate, and an annular plastic magnet, and has no adhesive layer between the annular support member and the annular plastic magnet, the annular plastic magnet being formed in a shape having, on an outer circumferential side thereof, a turning molded portion covering an outer circumferential part of the annular support member so as to turn around toward an inner diameter side, a gate of the injection molding mold being a disk gate located on an inner diameter side of the annular plastic magnet, a length L of the disk gate in an axial direction being in a range of 0.2 mm≤L≤0.6 mm, mechanical characteristics of a material of the annular plastic magnet being set such that a tensile strength is 65 MPa or more, and a Young's modulus is 4000 MPa or more and 15000 MPa or less, the method including:

opening the injection molding mold and placing the annular support member as an insert object in the injection molding mold; and closing the injection molding mold and injecting the material of the annular plastic magnet that is melted, into a cavity in the injection molding mold through the disk gate, to perform injection molding of the annular plastic magnet having the shape.

[2] In the magnetic encoder manufacturing method according to [1], the magnetic encoder is used for an automobile wheel support bearing device.

The magnetic encoder manufacturing method according to the present invention as described above mainly provides effects as described below.

(1) Since the annular support member and the annular plastic magnet do not adhere to each other, a process for applying a thermosetting adhesive to the annular support member is not needed. Therefore, troublesome management of degreasing and adhesion processes is not needed, and comparatively large-scale equipment for degreasing and adhesion processes is not needed. As a result, the manufacturing cost can be reduced.

(2) The mechanical characteristics of the material of the annular plastic magnet are set such that the tensile strength is not less than 65 MPa, and the Young's modulus is not less than 4000 MPa and not greater than 15000 MPa. Therefore, the contraction force of the annular plastic magnet formed in a shape having the turning molded portion covering the outer circumferential part of the annular support member so as to turn around toward the inner diameter side, acts on the annular support member made of a steel plate, and shock resistance is not deteriorated. Thus, a stable joining force between the annular support member and the annular plastic magnet is obtained, and a sufficient restraining force is obtained even against rotation in the circumferential direction. Therefore, in the magnetic encoder having no adhesive layer between the annular support member and the annular plastic magnet, it is not necessary to perform working on the annular support member for mechanically fixing the annular support member and the annular plastic magnet to each other, and thus the manufacturing cost for the annular support member can be reduced.

(3) The length L of the disk gate, in the axial direction, located on the inner diameter side of the annular plastic magnet of the injection molding mold is set within a range of 0.2 mm≤L≤0.6 mm, whereby the shear velocity of the melted plastic material at the disk gate is greatly reduced. Thus, in the annular plastic magnet, the residual stress after solidification of the melted plastic material on the inner side where a great thermal stress is applied is reduced, so that the thermal shock resistance is enhanced. Therefore, the annular plastic magnet is not damaged even under the usage environment in which the temperature greatly varies.

Thus, significant effects such as the above effects are provided.

DESCRIPTION OF HE PREFERRED EMBODIMENTS

Hereinafter, embodiments according to the present invention will be described with reference to the drawings.

As used herein, the direction of the rotation axis of an automobile wheel support bearing device A is referred to as "axial direction", and the direction perpendicular to the axial direction is referred to as "radial direction".

In the automobile wheel support bearing device A, the direction from the automobile body toward the wheel side is defined as "outward", and the direction opposite thereto is defined as "inward".

<Automobile Wheel Support Bearing Device>

Figure 1:
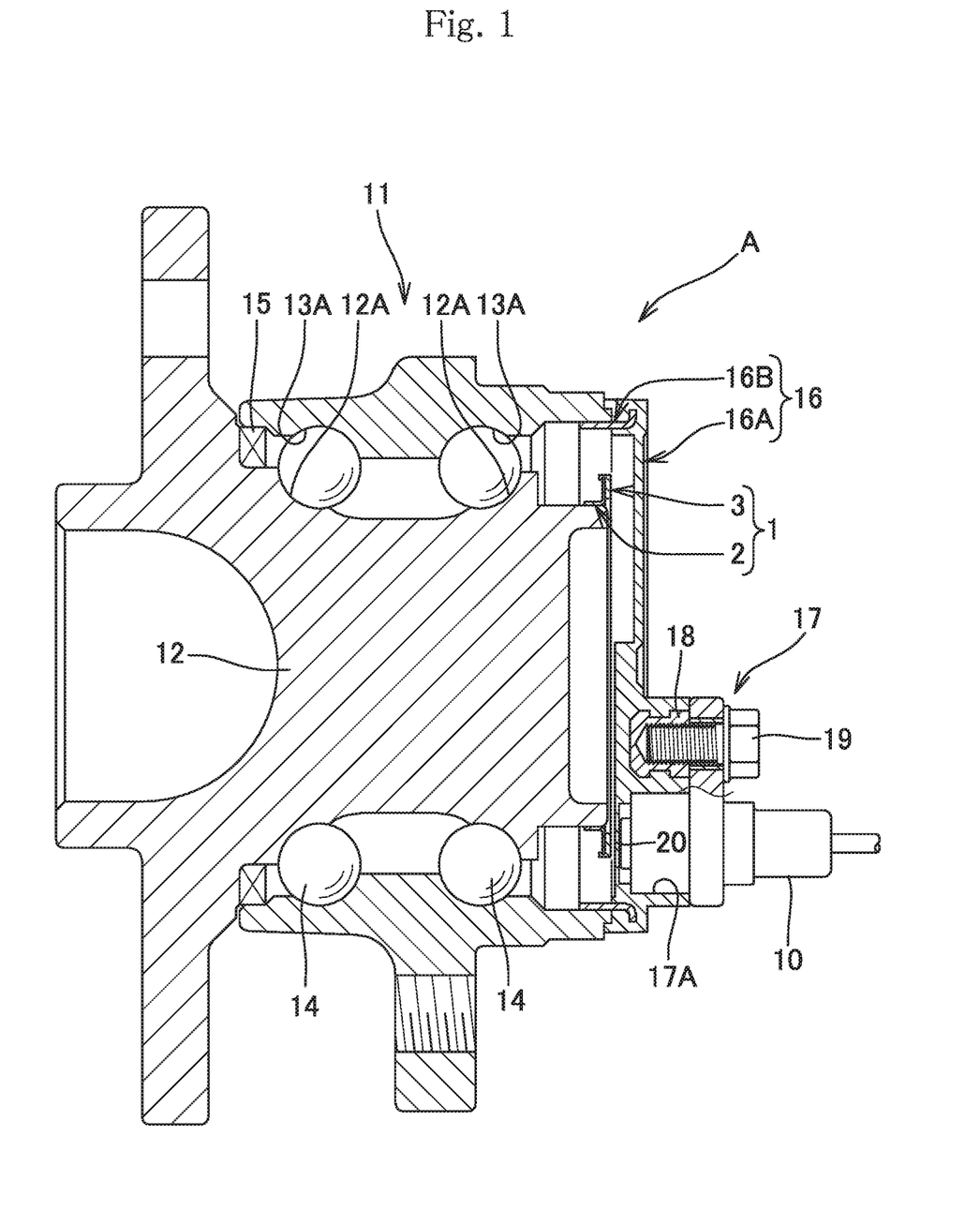
FIG. 1 is a partial vertical sectional view showing an example of an automobile wheel support bearing device including a magnetic encoder manufactured by a method according to an embodiment of the present invention.

As shown in a partial vertical sectional view in FIG. 1, the automobile wheel support bearing device A according to an embodiment of the present invention includes: a bearing 11 in which an inner ring 12 rotates relative to an outer ring 13; an axial-type magnetic encoder 1; a protection cover 16; a magnetic sensor 10; a seal member 15 provided at an outward end of the bearing 11; and so on.

The bearing 11 includes: the inner ring 12 having an inner ring raceway surface 12A formed on the outer circumferential surface thereof; the outer ring 13 having an outer ring raceway surface 134 on the inner circumferential surface thereof; rolling elements 14 which roll between the inner ring raceway surface 12A and the outer ring raceway surface 13A; and so on.

The magnetic encoder 1 includes an annular support member 2, and an annular plastic magnet 3 fixed to the annular support member 2 and magnetized in a multipole form so as to have N poles and S poles at regular intervals in the circumferential direction.

The magnetic encoder 1 is fixed to the inner ring 12 by the annular support member 2, and positioned at an inward end of the bearing 11.

The protection cover 16 includes a fiber reinforced plastic body 16A and a metal annular body 16B and is formed in a cup shape. The protection cover 16 is attached to the outer ring 13 so as to seal the inward end of the bearing 11, and has a sensor holder portion 17 for holding the magnetic sensor 10.

The sensor holder portion 17 holds a nut 18 to which an attachment bolt 19 for attaching the magnetic sensor 10 is screwed, and has a sensor attachment hole 17A into which the magnetic sensor 10 is inserted.

The magnetic sensor 10 mounted to the sensor holder portion 17 of the protection cover 16 is opposed to the magnetic encoder 1 with a partition wall 20 therebetween, and detects rotation of the magnetic encoder 1.

The magnetic sensor 10 is opposed to the magnetic encoder 1 with the partition wall 20 therebetween, and the protection cover 16 has no through hole penetrating in the thickness direction, thereby eliminating the necessity of a seal member such as an O-ring to be applied to the through hole.

In addition, since the inward end of the bearing 11 is sealed by the protection cover 16, a pebble, muddy water, or the like does not collide with the magnetic encoder 1. Thus, damage to the magnetic encoder 1 can be prevented.

Further, the inward end of the bearing 11 is sealed by the protection cover 16, thereby eliminating the necessity of a seal member to be applied to the inward side of the magnetic encoder 1. Thus, sliding resistance is reduced, whereby running torque of the bearing 11 can be reduced.

Further, since the protection cover 16 has the sensor holder portion 17, the trouble in adjusting the air gap between the magnetic encoder 1 and the magnetic sensor 10 can be eliminated.

<Magnetic Encoder>

Figure 2:
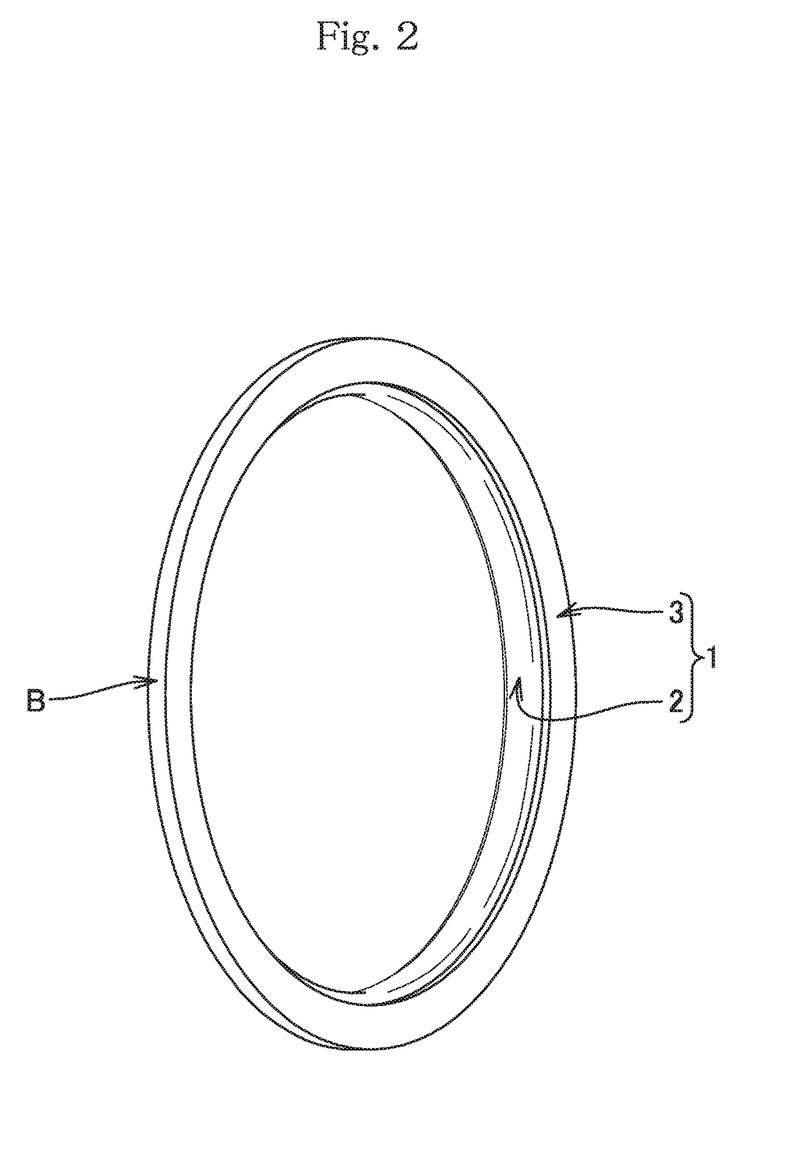
FIG. 2 is a perspective view of the magnetic encoder manufactured by the method according to the embodiment of the present invention.
Figure 3A:
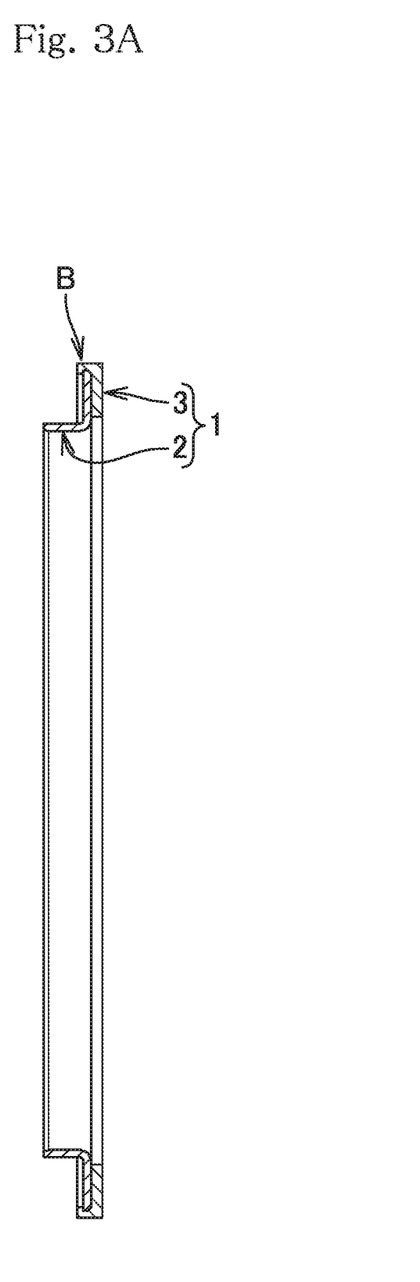
FIG. 3A is a vertical sectional view of the magnetic encoder.
Figure 3B:
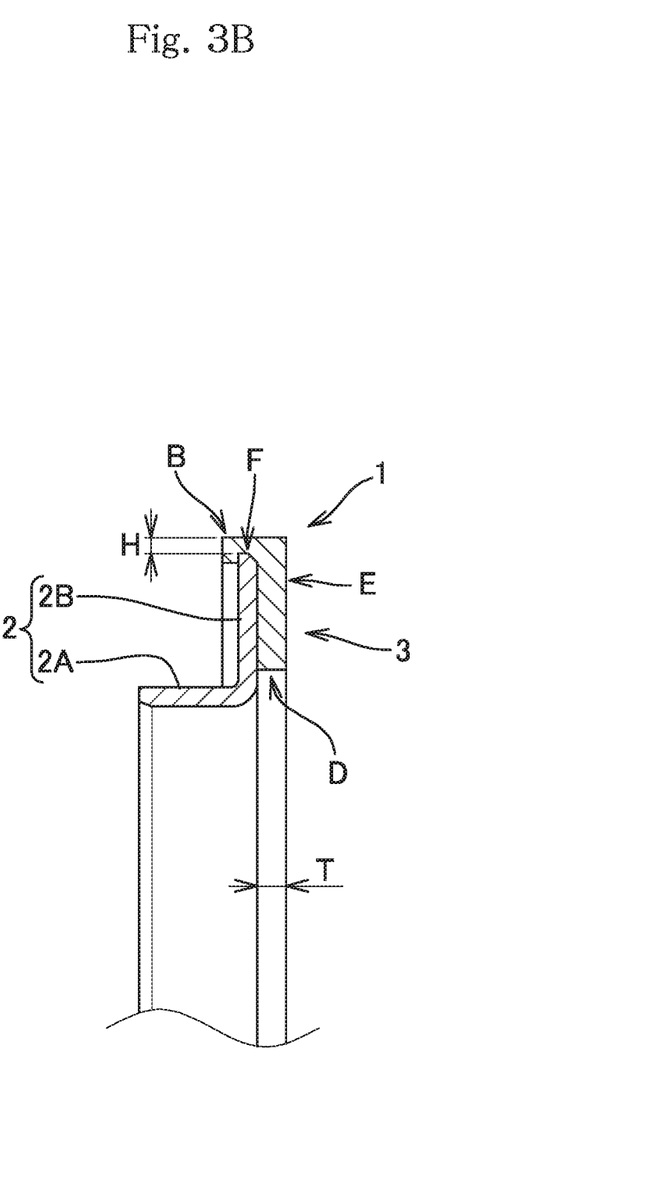
FIG. 3B is a major-part enlarged vertical sectional view of the magnetic encoder.

As shown in a perspective view in FIG. 2, a vertical sectional view in FIG. 3A, and a major-part enlarged vertical sectional view in FIG. 3B, the magnetic encoder 1 includes an annular support member 2 and an annular plastic magnet 3.

There is no adhesive layer between the annular support member 2 and the annular plastic magnet 3.

(Annular Support Member)

The annular support member 2 includes a cylindrical portion 2A, and a flange portion 2B extending outward in the radial direction from the end edge of the cylindrical portion 2A.

The annular support member 2 is formed by press working from a stainless-steel plate material.

(Annular Plastic Magnet)

The annular plastic magnet 3 is formed in a shape having, on the outer circumferential side thereof, a turning molded portion B covering the outer circumferential part of the annular support member 2 so as to turn around toward the inner diameter side.

The annular plastic magnet 3 is formed in the above shape by injection molding using the annular support member 2 as an insert object.

In consideration of fluidity of a melted plastic magnet material during injection molding, a difference H between the outer diameter (radius) of the annular plastic magnet 3 and the outer diameter (radius) of the annular support member 2 shown in FIG. 3B is preferably set to be not less than 0.3 mm, for obtaining a stable joining force between the annular plastic magnet 3 and the annular support member 2.

(Material of Annular Plastic Magnet)

The annular plastic magnet 3 is formed from a magnet material containing magnetic powder, a thermoplastic resin, and as necessary, an additive.

Magnetic powder used for a plastic magnet part of a commercially available magnetic encoder manufactured by insert molding can be used for the magnetic powder of the present invention. For example, ferritic magnetic powder of strontium ferrite, barium ferrite, or the like, or rare earth magnetic powder of neodymium-based material, samarium-based material, or the like, can be used. For the purpose of enhancing the magnetic property of the ferrite, lanthanum, cobalt, and the like may be mixed therein, or the ferrite may be partially replaced with rare earth magnetic powder of neodymium-iron-boron, samarium-cobalt, samarium-iron, or the like. One of these magnetic powders may be used alone, or two or more of these magnetic powders may be used in combination.

As the thermoplastic resin, for example, a thermoplastic resin such as polyamide (PA6, PA12, PA612, etc.) or polyphenylene sulfide (PPS) can be suitably used.

Examples of the additive include organic additives such as a carbon fiber, inorganic additives such as glass beads, a glass fiber, talc, mica, silicon nitride (ceramic), and crystalline amorphous) silica, benzenesulfonic acid alkylamides, toluenesulfonic acid alkylamides, hydroxybenzoic acid alkyl esters, and the like. One of these materials may be used alone, or two or more of these materials may be used in combination.

(Mechanical Characteristics of Material of Annular Plastic Magnet)

The mechanical characteristics of the material of the annular plastic magnet 3 are set such that the tensile strength is not less than 65 MPa, and the Young's modulus is not less than 4000 MPa and not greater than 15000 MPa.

Thus, the contraction force of the annular plastic magnet 3 formed in a shape having the turning molded portion B covering the outer circumferential part of the annular support member 2 so as to turn around toward the inner diameter side, acts on the annular support member 2 made of a steel plate, and shock resistance is not deteriorated. Therefore, a stable joining force between the annular support member 2 and the annular plastic magnet 3 is obtained, and a sufficient restraining force is obtained even against rotation in the circumferential direction.

<Magnetic Encoder Manufacturing Method>

Figure 4:
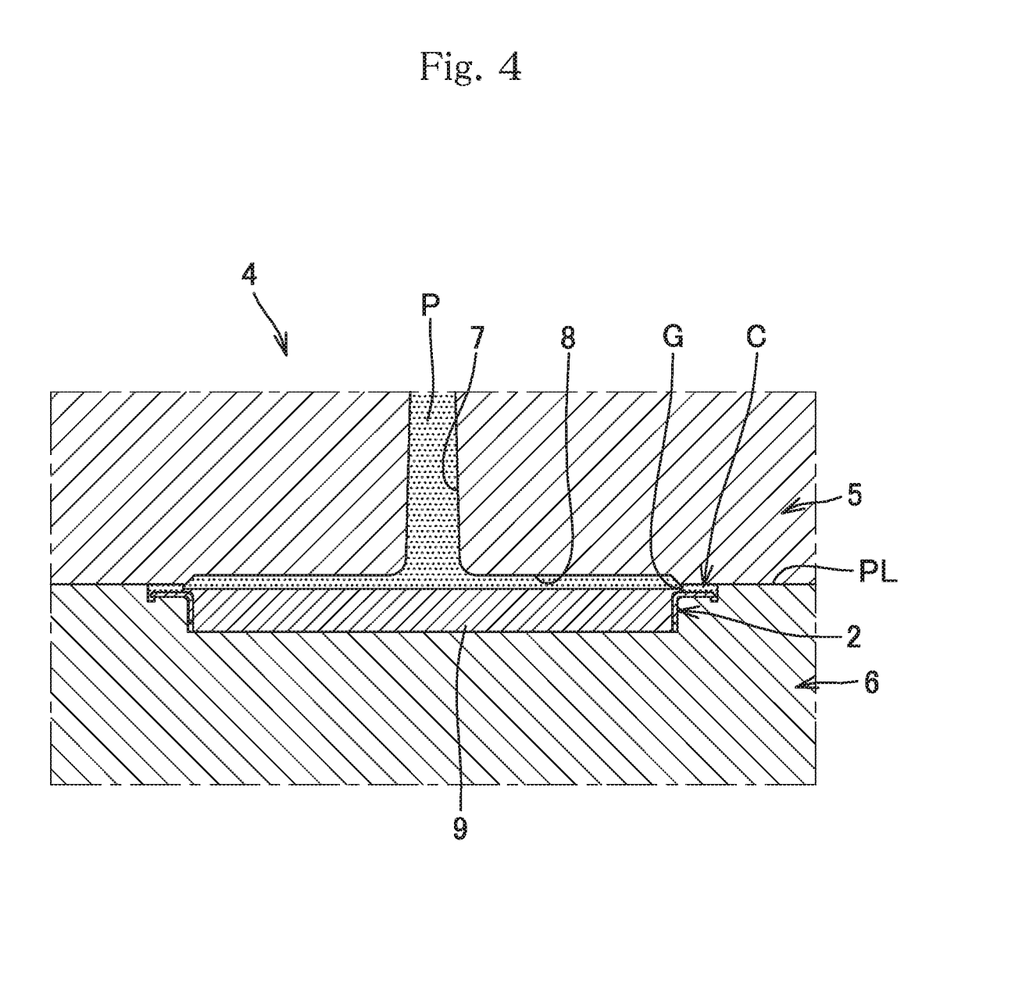
FIG. 4 is a vertical sectional view showing an example of an injection molding mold used in a magnetic encoder manufacturing method according to the embodiment of the present invention.
Figure 5A:
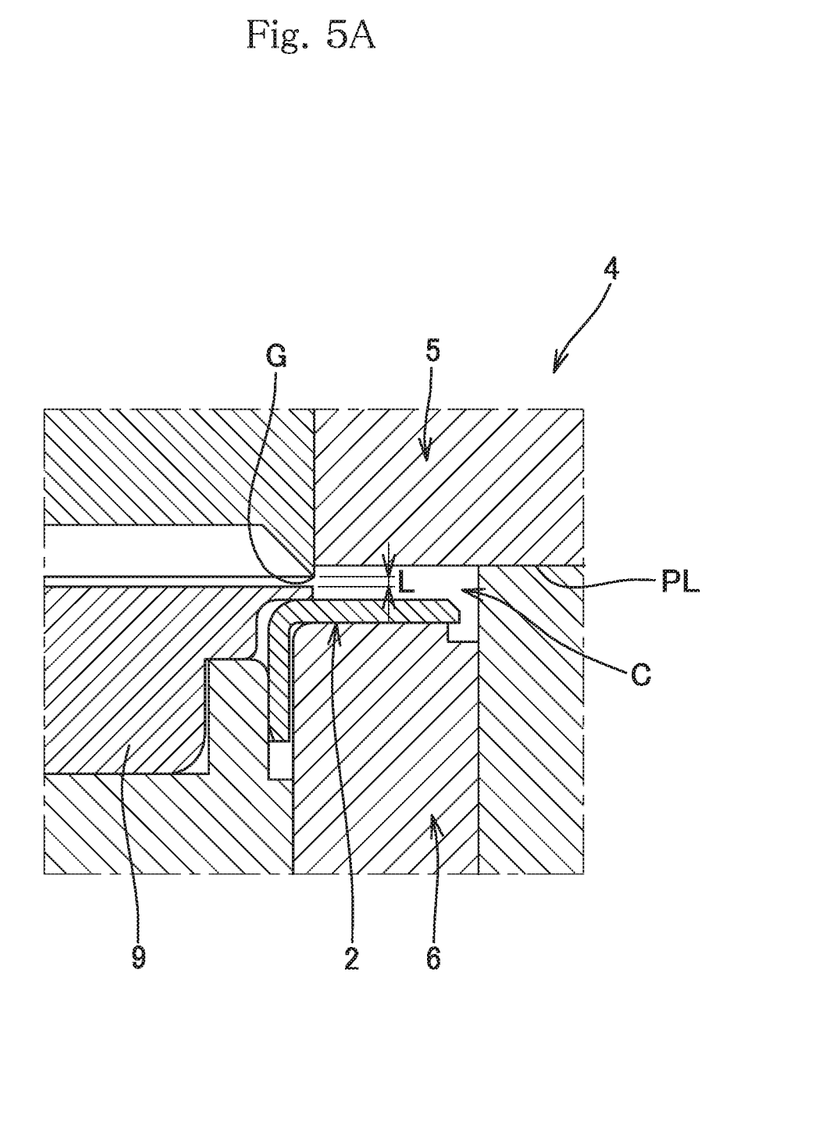
FIG. 5A is a major-part enlarged vertical sectional view of the injection molding mold.
Figure 5B:
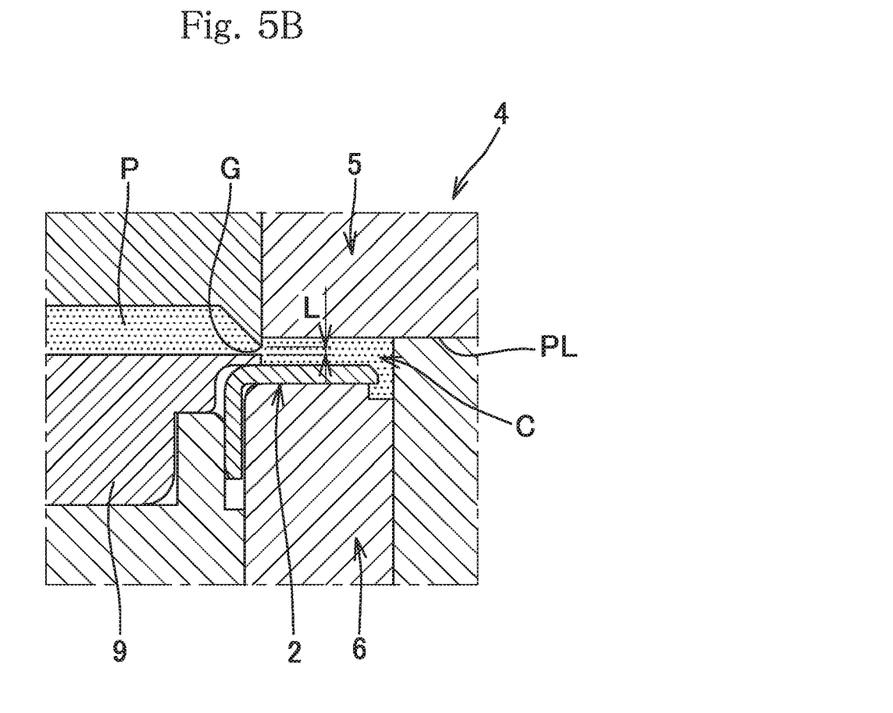
FIG. 5B is a major-part enlarged vertical sectional view showing a state in which a melted material of an annular plastic magnet is injected into a cavity through a disk gate.
Figure 5C:
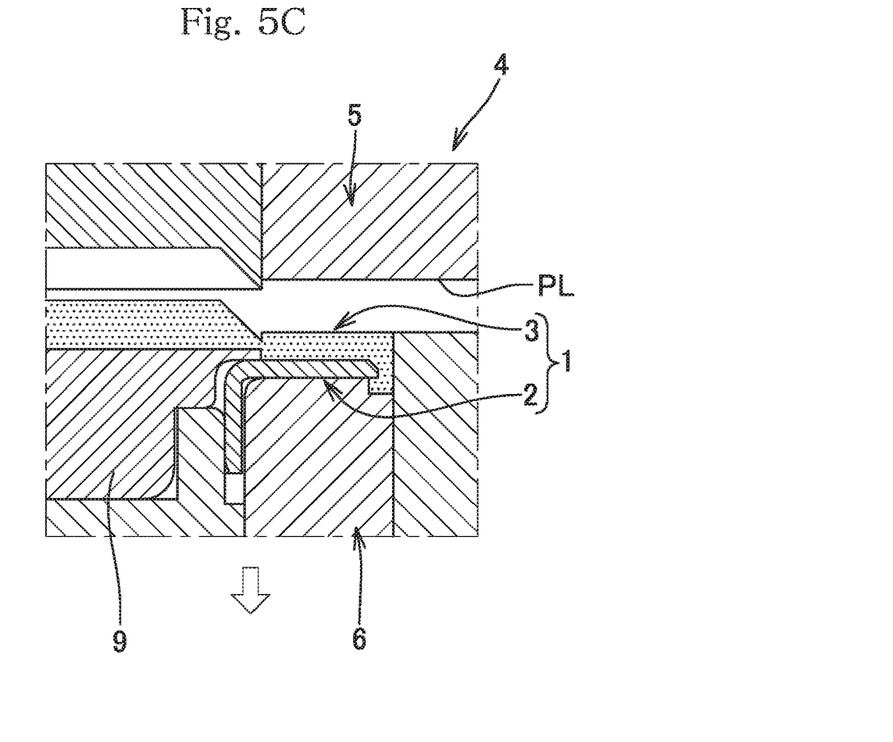
FIG. 5C is a major-part enlarged vertical sectional view showing a state in which the mold is opened after cooling.

The magnetic encoder 1 is manufactured using an injection molding mold 4 as shown in a vertical sectional view in FIG. 4 and major-part enlarged vertical sectional views in FIG. 5A, FIG. 5B, and FIG. 5C.

The injection molding mold 4 is mounted to an injection molding machine by fixing a fixed-side attachment plate (not shown) to a fixed board using a bolt, and fixing a movable-side attachment plate (not shown) to a movable board using a bolt.

(Injection Molding Mold)

The gate of the injection molding mold 4 is a disk gate G located on the inner diameter side of the annular plastic magnet 3. A length L in the axial direction of the disk gate G is set within a range of 0.2 mm≤L≤0.6 mm (Insert Object Setting Step)

The injection molding mold 4 is opened, the annular support member 2 is set as an insert object in a movable-side mold 6, and then the movable-side mold 6 is placed in the injection molding mold 4.

(Injection Molding Step)

In a state in which the injection molding mold 4 is closed and clamped, a melted material P (hereinafter, referred to as "melted plastic material P") for the annular plastic magnet 3 is injected through a sprue 7. The melted plastic material P passes through the runner 8 and then the disk gate G so as to fill the inside of a cavity C between the fixed-side mold 5 and the movable-side mold 6.

The melted plastic material P may be at a temperature at which the melted plastic material P has a viscosity allowing injection thereof and the melted plastic material P is not solidified. For example, the temperature of the melted plastic material P may be 200 to 360° C., but is not particularly limited thereto.

The direction of the sprue 7 (the injection direction of the melted plastic material P) is a horizontal direction.

(Molded Product Taking-Out Step)

After the melted plastic material P is cooled and solidified, the movable-side mold 6 is opened from a parting line PL as shown in the major-part enlarged vertical sectional view in FIG. 5C.

Next, the molded product that has not undergone gate cutting yet and the insert core 9 are taken out by being ejected by an ejector pin (not shown).

Next, a gate cutting process is performed to cut away the magnetic encoder 1 that is an insert molded product, from the gate part.

(Magnetization Step)

The annular plastic magnet 3 is magnetized in a multipole form in the circumferential direction. For this magnetization, for example, in the injection molding step, injection molding may be performed in an adjusted magnetic field, whereby the magnetic powder is subjected to magnetic field orientation. Alternatively, the magnetic encoder 1 obtained in the molded product taking-out step may be demagnetized, and then using a magnetization device such as a magnetization yoke prepared separately, magnetization may be performed in a multipole form so as to have N poles and S poles alternately in the circumferential direction of the annular plastic magnet 3.

<Thermal Stress Analysis>

In order to evaluate a thermal stress acting on the magnetic encoder 1 having no adhesive layer between the annular support member 2 and the annular plastic magnet 3, a thermal stress analysis was performed using MARC which is nonlinear structure analysis software.

(Analysis Condition and Evaluation Item)

The shape of the magnetic encoder 1 was the shape shown in FIG. 3A and FIG. 3B, and had the following mechanical characteristic values and thermal characteristic values.

Regarding the annular support member 2, the Young's modulus was 206800 MPa, the Poisson's ratio was 0.29, and the linear expansion coefficient was $1.17 \times 10^{-05}$. Regarding the annular plastic magnet 3, the Young's modulus was 4200 MPa, the Poisson's ratio was 0.35, and the linear expansion coefficient was $5.00 \times 10^{-05}$.

A thermal distortion at −40° C. was applied to a 2D axisymmetric model, using, as a reference temperature, 20° C. which is the standard state temperature of JIS Z 8703, without adhesion between the annular support member 2 and the annular plastic magnet 3, and a stress that occurred at each part at that time was used as an evaluation item.

(Analysis Result)

The greatest stress occurred at an outer circumferential part F in FIG. 3B. With the stress at the outer circumferential part F defined as 1, a stress of 0.7 occurred at a central part E, and a stress of 0.9 occurred at an inner circumferential part D. That is, it is found that a great thermal stress occurs at the inner circumferential part D, where the melted plastic material P is injected at a high pressure from the disk gate G located on the inner diameter side of the annular plastic magnet 3, in the injection molding step.

When the annular support member 2 and the annular plastic magnet 3 do not adhere to each other, no adhesive layer that functions as a buffer material is needed. Accordingly, a comparatively great thermal stress seems to occur also at the inner circumferential part.

<Shear Velocity Analysis>

In order to evaluate the shear velocity at the part where the melted plastic material P is injected at a high pressure from the disk gate G, a shear velocity analysis was performed using Simulation Moldflow which is a simulation tool for plastic injection molding.

(Analysis Condition and Evaluation Item)

A thickness T of the annular plastic magnet 3 in FIG. 3B was set to 0.9 mm, the material data was set to PA12-ferrite bond magnet, the resin temperature was set to 268° C., the mold temperature was set to 80° C., and the injection flow rate was set to 43 cc/s. Under this condition, the shear velocity of the melted plastic material P at the disk gate G depending on the length L (see FIG. 5A and FIG. 5B) in the axial direction of the disk gate G was used as an evaluation item.

Here, the "shear velocity" is an index indicating a speed difference between resin layers (e.g., solidified layer and fluid layer).

When the "shear velocity" is too fast, the molecules are not in a stable entangled state, but are elongated in the flowing direction. When the filling with the resin is completed, the resin no longer flows, and therefore the molecules attempt to return into the original equivalent state. However, the resin is cooled by the mold and then solidified. Thus, the elongated molecules can no longer return into the original state, so that a stress remains in the molded product (residual stress).

(Analysis Result)

Figure 6:
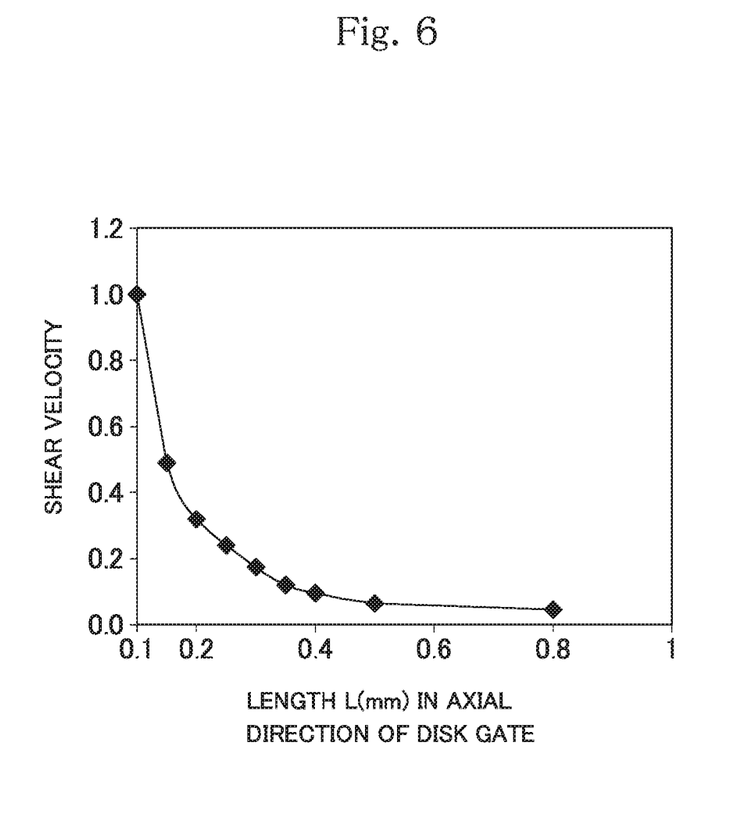
FIG. 6 is a graph showing change in the shear velocity depending on the length in the axial direction of the disk gate.

FIG. 6 shows the shear velocity of the melted plastic material P at the disk gate G in each of the cases where the length L of the disk gate G in the axial direction was set to 0.1 mm, 0.15 mm, 0.2 mm, 0.25 mm, 0.3 mm, 0.35 mm, 0.4 mm, 0.5 mm, and 0.8 mm. In the graph, the shear velocity when L=0.1 mm is defined as 1.

It is found that the shear velocity of the melted plastic material P at the disk gate G is greatly reduced when the length L of the disk gate G in the axial direction is 0.2 mm or greater.

When the shear velocity of the melted plastic material P is great, the residual stress after solidification increases, whereas when the shear velocity is small, the residual stress after solidification decreases.

<Thermal Shock Test>

In order to evaluate the thermal shock resistance under the usage environment in which the temperature greatly varies, the magnetic encoder 1 having the shape shown in FIG. 3A and FIG. 3B was manufactured, and a thermal shock test was performed on the manufactured magnetic encoder 1, in which, in each cycle, the magnetic encoder 1 was situated under an environment at 120° C. for 30 minutes and then was situated under an environment at −40° C. for 30 minutes.

(Test Condition and Evaluation Item)

The magnetic encoder 1 was manufactured with the thickness T of the annular plastic magnet 3 shown in FIG. 3B being set to 0.9 mm, while the length L of the disk gate G, in the axial direction, of the injection molding mold 4 was changed. The mechanical characteristics of the annular plastic magnet 3 were as follows: the Young's modulus was 4200 MPa, and the tensile strength was 70 Mpa.

The annular support member 2 was made of a stainless-steel plate, and the annular plastic magnet 3 was a PA12-ferrite bond magnet.

Through the thermal shock test, the case with no damage after 1000 cycles (threshold in generally required specifications for magnetic encoders to be used in automobile wheel support bearing devices) was regarded as acceptable, and the case with damage in less than 1000 cycles was regarded as unacceptable.

EXAMPLES AND COMPARATIVE EXAMPLE

The magnetic encoders 1 manufactured using the injection molding mold 4 with the length L of the disk gate G in the axial direction was set to 0.2 mm, 0.3 mm, and 0.5 mm are defined as Example 1, Example 2, and Example 3, respectively.

The magnetic encoder 1 manufactured using the injection molding mold 4 with the length L of the disk gate Gin the axial direction was set to 0.1 mm is defined as Comparative example 1.

(Test Result)

Table 1 shows the test result.

On the basis of this test result, the length L of the disk gate G, in the axial direction, of the injection molding mold 4 in the present invention is set to be not less than 0.2 mm.

Considering ease of gate cutting, it is preferable to satisfy $L \leq 0.6$ mm. Therefore, in the present invention, the length L is set within a range of $0.2 \text{ mm} \leq L \leq 0.6$ mm, as described above.

<Effects>

The method for manufacturing the magnetic encoder 1 according the embodiment of the present invention mainly provides the following effects.

(1) Since the annular support member 2 and the annular plastic magnet 3 do not adhere to each other, a process for applying a thermosetting adhesive to the annular support member 2 is not needed. Therefore, troublesome management of degreasing and adhesion processes is not needed, and comparatively large-scale equipment for degreasing and adhesion processes is not needed. As a result, the manufacturing cost can be reduced.

(2) The mechanical characteristics of the material of the annular plastic magnet 3 are set such that the tensile strength is not less than 65 MPa, and the Young's modulus is not less than 4000 MPa and not greater than 15000 MPa. Therefore, the contraction force of the annular plastic magnet 3 formed in a shape having the turning molded portion B covering the outer circumferential part of the annular support member 2 so as to turn around toward the inner diameter side, acts on the annular support member 2 made of a steel plate, and shock resistance is not deteriorated. Thus, a stable joining force between the annular support member 2 and the annular plastic magnet 3 is obtained, and a sufficient restraining force is obtained even against rotation in the circumferential direction. Therefore, in the magnetic encoder 1 having no adhesive layer between the annular support member 2 and the annular plastic magnet 3, it is not necessary to perform working on the annular support member 2 for mechanically fixing the annular support member 2 and the annular plastic

TABLE 1

| | Example/Comparative example | | | |
|---|---|---|---|---|
| | Example 1 | Example 2 | Example 3 | Comparative example 1 |
| Length L (mm) in axial direction of disk gate | 0.2 | 0.3 | 0.5 | 0.1 |
| Shear velocity | 0.319 | 0.175 | 0.069 | 1.0 |
| Thermal shock resistance test result (1 cycle: 120° C., 30 minutes ↔ −40° C., 30 minutes) | Acceptable | Acceptable | Acceptable | Unacceptable |

Acceptable: no damage in 1000 cycles
Unacceptable: damaged in less than 1000 cycles The case where the length L of the disk gate G in the axial direction was 0.1 mm (Comparative example 1) was unacceptable because the damage occurred in 451 cycles.

In contrast, the cases where the length L of the disk gate G in the axial direction was 0.2 mm (Example 1), 0.3 mm (Example 2), and 0.5 mm (Example 3) were acceptable because no damage occurred even after conduction of 1000 or more cycles of the thermal shock test.

Therefore, it is found that the thermal shock resistance is enhanced when the length L of the disk gate G, in the axial direction, of the injection molding mold 4 is set to be not less than 0.2 mm.

magnet 3 to each other, and thus the manufacturing cost for the annular support member 2 can be reduced.

(3) The length L of the disk gate G in the axial direction, which is located on the inner diameter side of the annular plastic magnet 3 of the injection molding mold 4 is set within a range of $0.2 \text{ mm} \leq L \leq 0.6$ mm, whereby the shear velocity of the melted plastic material P at the disk gate G is greatly reduced. Thus, in the annular plastic magnet 3, the residual stress after solidification of the melted plastic material P on the inner side where a great thermal stress is applied is reduced, so that the thermal shock resistance is enhanced. Therefore, the annular plastic magnet 3 is not damaged even under the usage environment in which the temperature greatly varies.

<Modifications of Magnetic Encoder>

Next, modifications of the magnetic encoder 1 will be described.

Figure 7A:
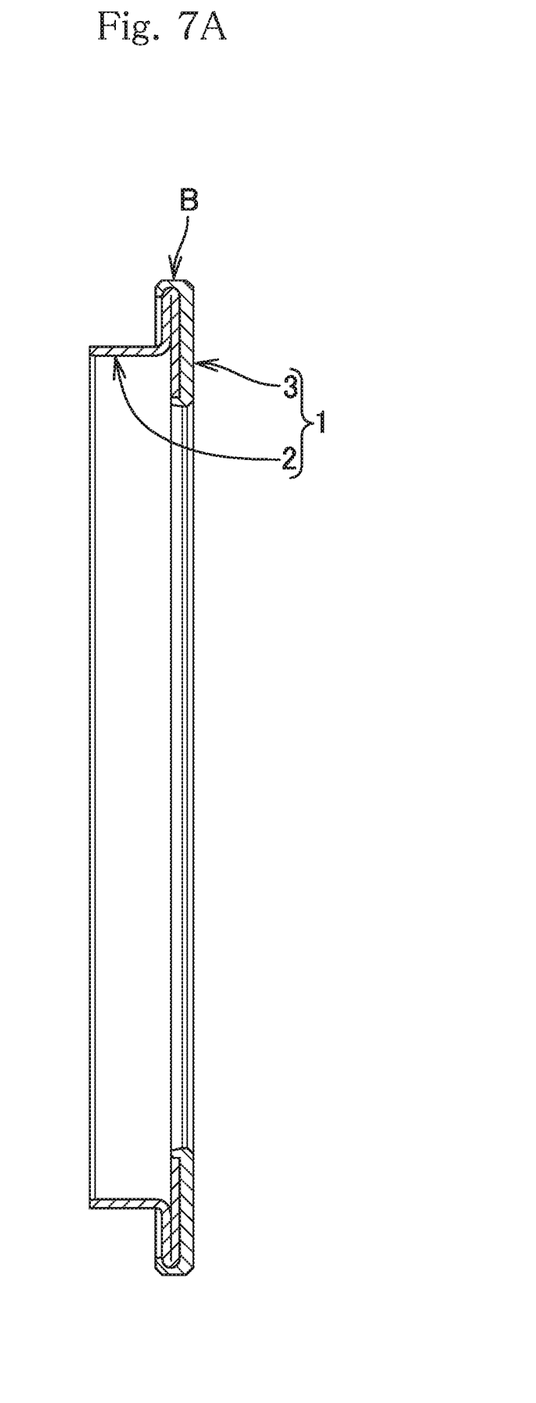
FIG. 7A is a vertical sectional view showing a modification of the magnetic encoder manufactured by the method according to the embodiment of the present invention.
Figure 7B:
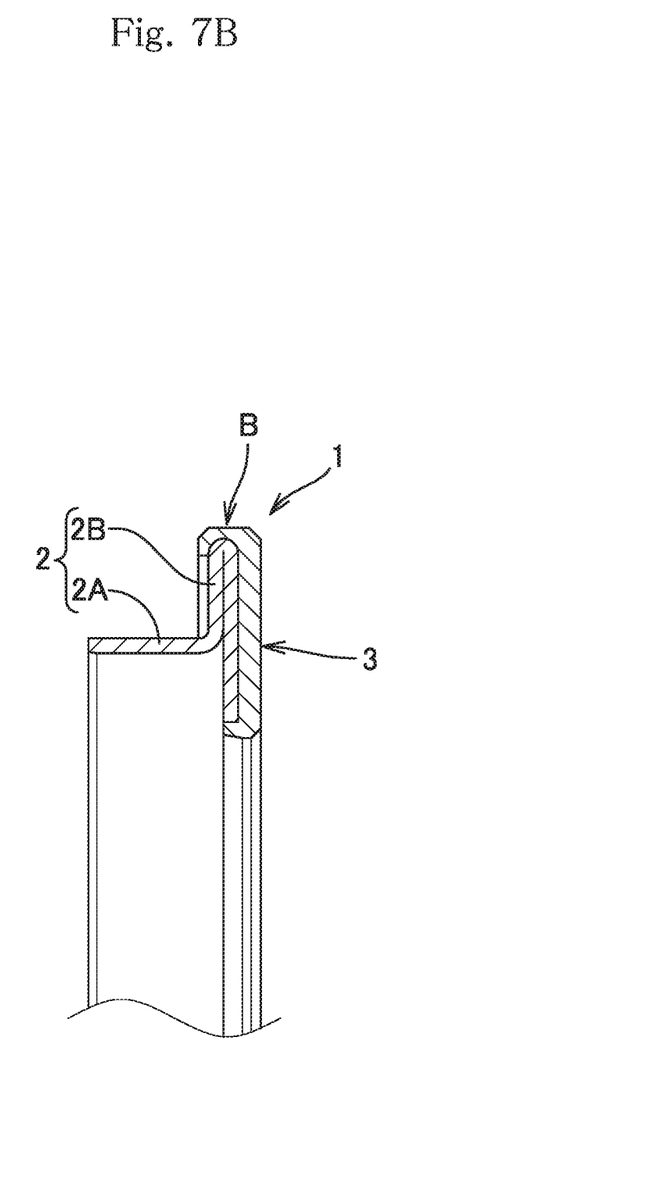
FIG. 7B is a major-part enlarged vertical sectional view showing the modification.
Figure 8A:
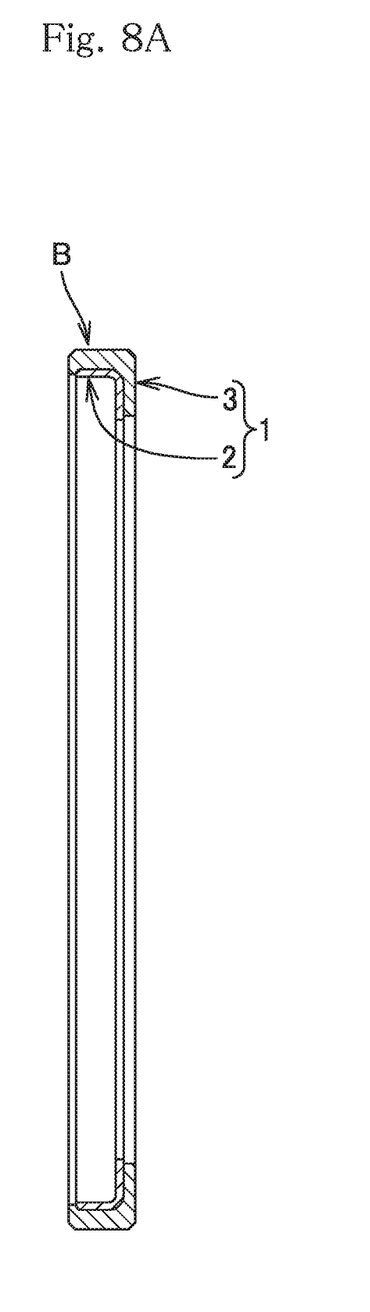
FIG. 8A is a vertical sectional view showing another modification of the magnetic encoder manufactured by the method according to the embodiment of the present invention.
Figure 8B:
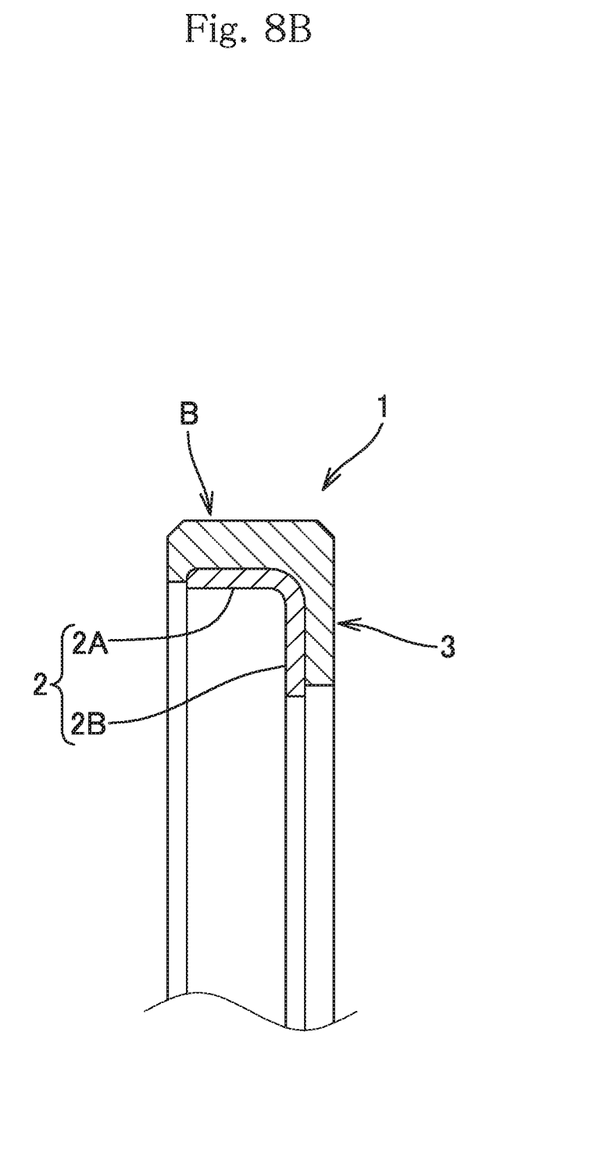
FIG. 8B is a major-part enlarged vertical sectional view showing the other modification.

A magnetic encoder 1 shown in a vertical sectional view in FIG. 7A and a major-part enlarged vertical sectional view in FIG. 7B is the same axial type as the magnetic encoder 1 shown in the vertical sectional view in FIG. 3A and the major-part enlarged vertical sectional view in FIG. 3B, and a magnetic encoder 1 shown in a vertical sectional view in FIG. 8A and a major-part enlarged vertical sectional view in FIG. 8B is a radial type.

An annular support member 2 in the vertical sectional views in FIG. 8A and FIG. 8B includes a cylindrical portion 2A, and a flange portion 2B extending inward in the radial direction from the end edge of the cylindrical portion 2A.

In each of the magnetic encoders 1 according to the above modifications, the annular plastic magnet 3 has, on the outer circumferential side thereof, a turning molded portion B covering the outer circumferential part of the annular support member 2 so as to turn around toward the inner diameter side, and the mechanical characteristics of the material of the annular plastic magnet 3 are set such that the tensile strength is not less than 65 MPa, and the Young's modulus is not less than 4000 MPa and not greater than 15000 MPa.

The gate of the injection molding mold for manufacturing the above magnetic encoder 1 is a disk gate located on the inner diameter side of the annular plastic magnet 3, and the length L of the disk gate in the axial direction is set within a range of 0.2 mm≤L≤0.6 mm.

The method for manufacturing the above magnetic encoder 1 includes: a step of opening the injection molding mold and placing the annular support member 2 as an insert object in the injection molding mold; and a step of closing the injection molding mold and injecting the melted material of the annular plastic magnet 3 into the cavity in the injection molding mold through the disk gate, to perform injection molding of the annular plastic magnet 3.

The description of the above embodiment is in all aspects illustrative and not restrictive. Various improvements and modifications can be made without departing from the scope of the present invention.

What is claimed is:

1. A magnetic encoder manufacturing method for manufacturing, using an injection molding mold, a magnetic encoder which includes an annular support member formed from a steel plate, and an annular plastic magnet, and has no adhesive layer between the annular support member and the annular plastic magnet, the annular plastic magnet contains magnetic powder and a thermoplastic resin, the thermoplastic resin is polyamide or polyphenylene sulfide, the annular plastic magnet being formed in a shape having, on an outer circumferential side thereof, a turning molded portion covering an outer circumferential part of the annular support member so as to turn around toward an inner diameter side of the annular support member, a gate of the injection molding mold being a disk gate located on an inner diameter side of the annular plastic magnet, a length L of the disk gate in an axial direction being in a range of 0.2 mm≤L≤0.6 mm, mechanical characteristics of a material of the annular plastic magnet being set such that a tensile strength is 65 MPa or more, and a Young's modulus is 4000 MPa or more and 15000 MPa or less, the method comprising:

opening the injection molding mold and placing the annular support member as an insert object in the injection molding mold; and closing the injection molding mold and injecting the material of the annular plastic magnet that is melted, into a cavity in the injection molding mold through the disk gate, to perform injection molding of the annular plastic magnet having the shape.

2. The magnetic encoder manufacturing method according to claim 1, wherein the magnetic encoder is used for an automobile wheel support bearing device.

* * * * *